United States Patent
Adibhatla et al.

(10) Patent No.: US 7,861,578 B2
(45) Date of Patent: Jan. 4, 2011

(54) METHODS AND SYSTEMS FOR ESTIMATING OPERATING PARAMETERS OF AN ENGINE

(75) Inventors: Sridhar Adibhatla, Glendale, OH (US); Matthew William Wiseman, Fairfield, OH (US); Brian Francis Nestico, Mason, OH (US); Daniel Edgardo Viassolo, Schenectady, NY (US); Brent Jerome Brunell, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 12/181,835

(22) Filed: Jul. 29, 2008

(65) Prior Publication Data

US 2010/0024536 A1    Feb. 4, 2010

(51) Int. Cl.
*G01M 15/00*    (2006.01)
(52) U.S. Cl. .................................. 73/112.01
(58) Field of Classification Search ............... 73/112.01
See application file for complete search history.

(56) References Cited

U.S. PATENT DOCUMENTS

| | | | |
|---|---|---|---|
| 3,834,222 A | 9/1974 | McDonald | |
| 4,275,557 A | 6/1981 | Marvin et al. | |
| 4,541,271 A | 9/1985 | Flaig et al. | |
| 4,541,386 A | 9/1985 | Kishi et al. | |
| 4,581,888 A * | 4/1986 | Schmitzer et al. | 60/39.091 |
| 5,031,102 A | 7/1991 | Robbins et al. | |
| 5,099,683 A | 3/1992 | Remboski, Jr. et al. | |
| 5,299,765 A | 4/1994 | Blechen | |
| 5,448,881 A * | 9/1995 | Patterson et al. | 60/794 |
| 5,528,928 A | 6/1996 | Baker et al. | |
| 5,739,417 A | 4/1998 | Grob et al. | |
| 5,922,948 A | 7/1999 | Lesko et al. | |
| 6,532,412 B2 * | 3/2003 | Adibhatla et al. | 701/100 |
| 6,532,433 B2 * | 3/2003 | Bharadwaj et al. | 702/182 |
| 6,539,783 B1 * | 4/2003 | Adibhatla | 73/112.06 |
| 6,543,397 B2 | 4/2003 | Sandberg et al. | |
| 6,606,580 B1 * | 8/2003 | Zedda et al. | 702/185 |
| 6,823,675 B2 * | 11/2004 | Brunell et al. | 60/773 |
| 6,873,902 B2 | 3/2005 | Welch | |
| 6,985,781 B2 * | 1/2006 | Keeler et al. | 700/44 |
| 7,020,595 B1 * | 3/2006 | Adibhatla et al. | 703/7 |
| 7,277,838 B2 * | 10/2007 | Volponi et al. | 703/7 |
| 7,409,854 B2 | 8/2008 | Teolis et al. | |
| 7,415,328 B2 * | 8/2008 | Volponi | 701/9 |

(Continued)

OTHER PUBLICATIONS

Oliver F. Qi and N.R.L. MacCallum; "A Model-Based Approach to the Control of an Aircraft Gas Turbine Engine"; The American Society of Mechanical Engineers; presented at the International Gas Turbine and Aeroengine Congress and Exposition; Cincinnati, OH ; May 24-27, 1993; 7 pages.

(Continued)

*Primary Examiner*—Freddie Kirkland, III
(74) *Attorney, Agent, or Firm*—William Scott Andes, Esq.; Armstrong Teasdale LLP

(57) ABSTRACT

A method for estimating an operating parameter of a turbine engine is provided. The method includes receiving at least one sensor input, calculating the operating parameter using at least the one sensor input, and determining whether an anomaly is present in the calculated operating parameter using a redundancy system. An estimated operating parameter is output.

17 Claims, 4 Drawing Sheets

U.S. PATENT DOCUMENTS

| | | | |
|---|---|---|---|
| 7,472,100 B2 * | 12/2008 | Volponi et al. | 706/45 |
| 7,505,844 B2 * | 3/2009 | Wiseman et al. | 701/100 |
| 7,603,222 B2 * | 10/2009 | Wiseman et al. | 701/100 |
| 2002/0161550 A1 * | 10/2002 | Bharadwaj et al. | 702/182 |
| 2004/0193359 A1 | 9/2004 | Welch | |
| 2005/0193739 A1 * | 9/2005 | Brunell et al. | 60/772 |
| 2006/0212281 A1 * | 9/2006 | Mathews et al. | 703/7 |
| 2007/0055392 A1 * | 3/2007 | D'Amato et al. | 700/44 |
| 2007/0118270 A1 * | 5/2007 | Wiseman et al. | 701/100 |
| 2007/0118271 A1 * | 5/2007 | Wiseman et al. | 701/100 |
| 2007/0240426 A1 * | 10/2007 | Wiegman et al. | 60/793 |
| 2007/0260424 A1 | 11/2007 | Brown et al. | |
| 2008/0042643 A1 | 2/2008 | Maier et al. | |
| 2010/0023238 A1 * | 1/2010 | Adibhatla | 701/100 |

OTHER PUBLICATIONS

S. Abidhatla and T. J. Lewis; "Model-Based Intelligent Digital Engine Control (MoBIDEC)"; in AIAA-97-3192, 33rd Joint Propulsion Conference, Jul. 1997; 10 pages.

S. Abidhatla, H. Brown and Z. Gastineau; "Intelligent Engine Control (IEC)"; AAIA/SAE/ASME/ASEE; 28th Joint Propulsion Conference and Exhibit; Jul. 6-8, 1992 Nashville, TN; 8 pages.

* cited by examiner

METHODS AND SYSTEMS FOR ESTIMATING OPERATING PARAMETERS OF AN ENGINE

The U.S. Government has certain rights in this invention as provided for by the terms of Contract No. N00019-04-C-0093.

BACKGROUND OF THE INVENTION

The field of the invention relates generally to turbine engines and, more particularly, to methods and systems for estimating operating parameters for controlling a turbine engine.

In at least some known turbine engines, engine performance and operability is determined using operating parameters of the engine. At least some of these operating parameters are un-measurable parameters, for example, parameters that cannot be measured by sensors, such as thrust and/or stall margin, and/or that are impractical to measure using sensors, such as combustor exit temperature and/or turbine inlet temperature.

At least some known engine control systems indirectly control and/or monitor un-measurable operating parameters by using measured quantities, such as a corrected fan speed, an engine pressure ratio, and/or corrected fuel ("phi") schedules. However, because un-measurable operating parameters inferred or estimated from such measured quantities may not be very accurate, large design margins are used for gas turbine engines that include such known control systems. Large design margins may reduce the performance and/or condition of the gas turbine engine. As such, there is a need to more accurately determine the un-measurable operating parameters of a gas turbine engine.

BRIEF DESCRIPTION OF THE INVENTION

In one embodiment, a method for estimating an operating parameter of a turbine engine is provided. The method includes receiving at least one sensor input, calculating the operating parameter using at least the one sensor input, and determining whether an anomaly is present in the calculated operating parameter using a redundancy system. An estimated operating parameter is output.

In another embodiment, an estimation system for estimating an operating parameter is provided. The estimation system includes a primary model configured to receive at least a sensor input and to estimate the operating parameter using at least the sensor input. The estimation system also includes a redundancy system configured to receive the estimated operating parameter and to determine whether an anomaly is present within the estimated operating parameter.

In yet another embodiment, a gas turbine engine for use in an aircraft is provided. The gas turbine engine includes at least one sensor configured to sense an engine parameter and to generate a sensor input representing the engine parameter, a control system configured to control at least one of the gas turbine engine and the aircraft, and an estimation system coupled in communication with the control system. The estimation system is configured to output an estimated operating parameter to the control system. The estimation system includes a primary model configured to receive at least the sensor input and to estimate the operating parameter using at least the sensor input, and a redundancy system configured to receive the estimated operating parameter and to determine whether an anomaly is present within the estimated operating parameter.

The embodiments provided herein facilitate the generation of accurate estimates of un-measurable operating parameters based on at least one measured parameter. Further, the embodiments described herein provide a redundant system to facilitate improving the accuracy of the estimated operating parameters.

DETAILED DESCRIPTION OF THE INVENTION

The embodiments described herein provide a model within a control system, such as a Full Authority Digital Engine Control (FADEC) and/or an on-board computer. The model is used to calculate thrusts, stall margins, and/or other un-measurable or difficult to measure operating parameters, such as clearances for use by the engine control system, using measured parameters. The embodiments described herein can be implemented within a system and are accurate enough to satisfy stringent control specifications for certain operating modes of the system. For example, the embodiments described herein may be implemented in an aircraft having at least a wing-born mode and jet-born mode, wherein the embodiments described herein are accurate enough to satisfy the requirements for operating in jet-born, or hover, mode. Further, the embodiments described herein compensate for anomalies in the model by providing a redundancy system.

The following detailed description illustrates embodiments by way of example and not by way of limitation. It is contemplated that the embodiments described herein have general application to analytical and methodical embodiments of determining operating parameters of equipment using sensors at locations remote from the location of interest in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
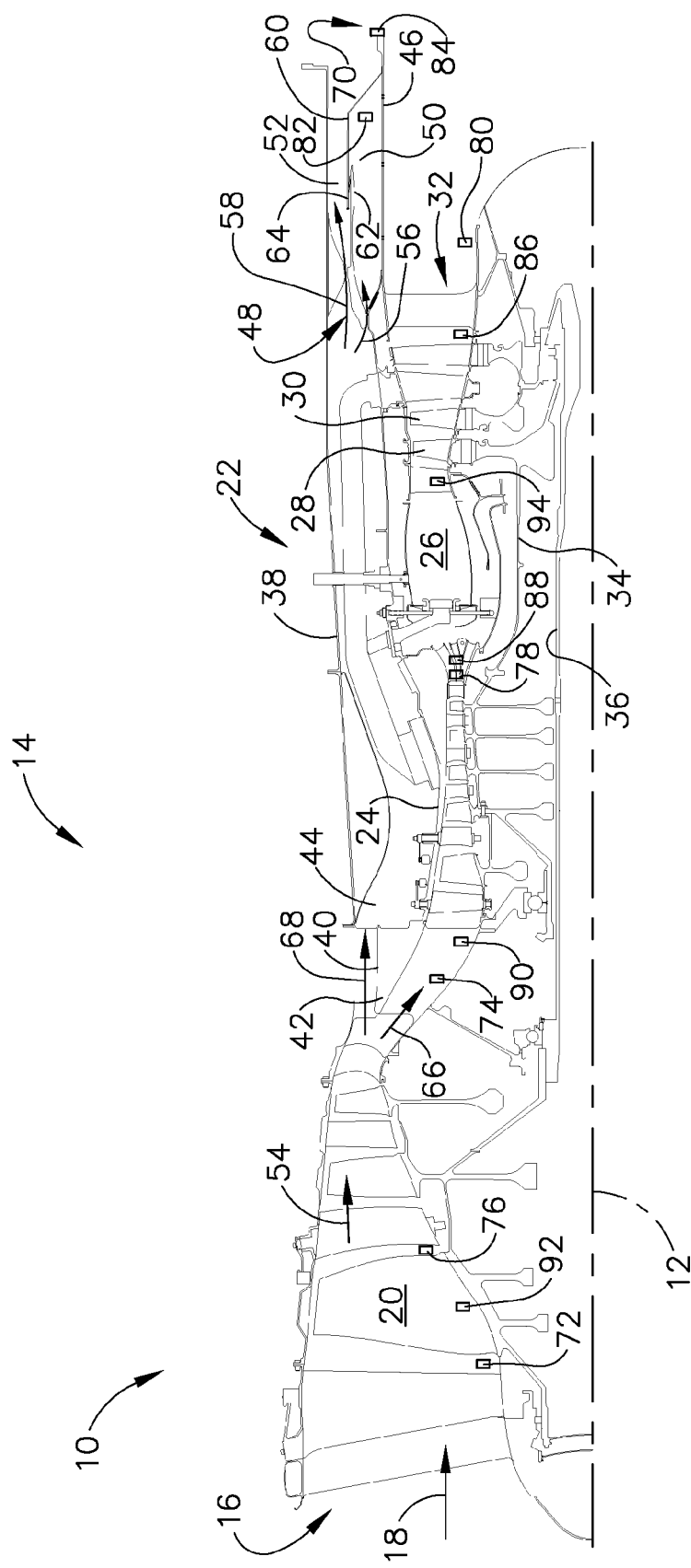
FIG. 1 is a schematic view of an exemplary variable cycle gas turbine engine.
Figure 2:
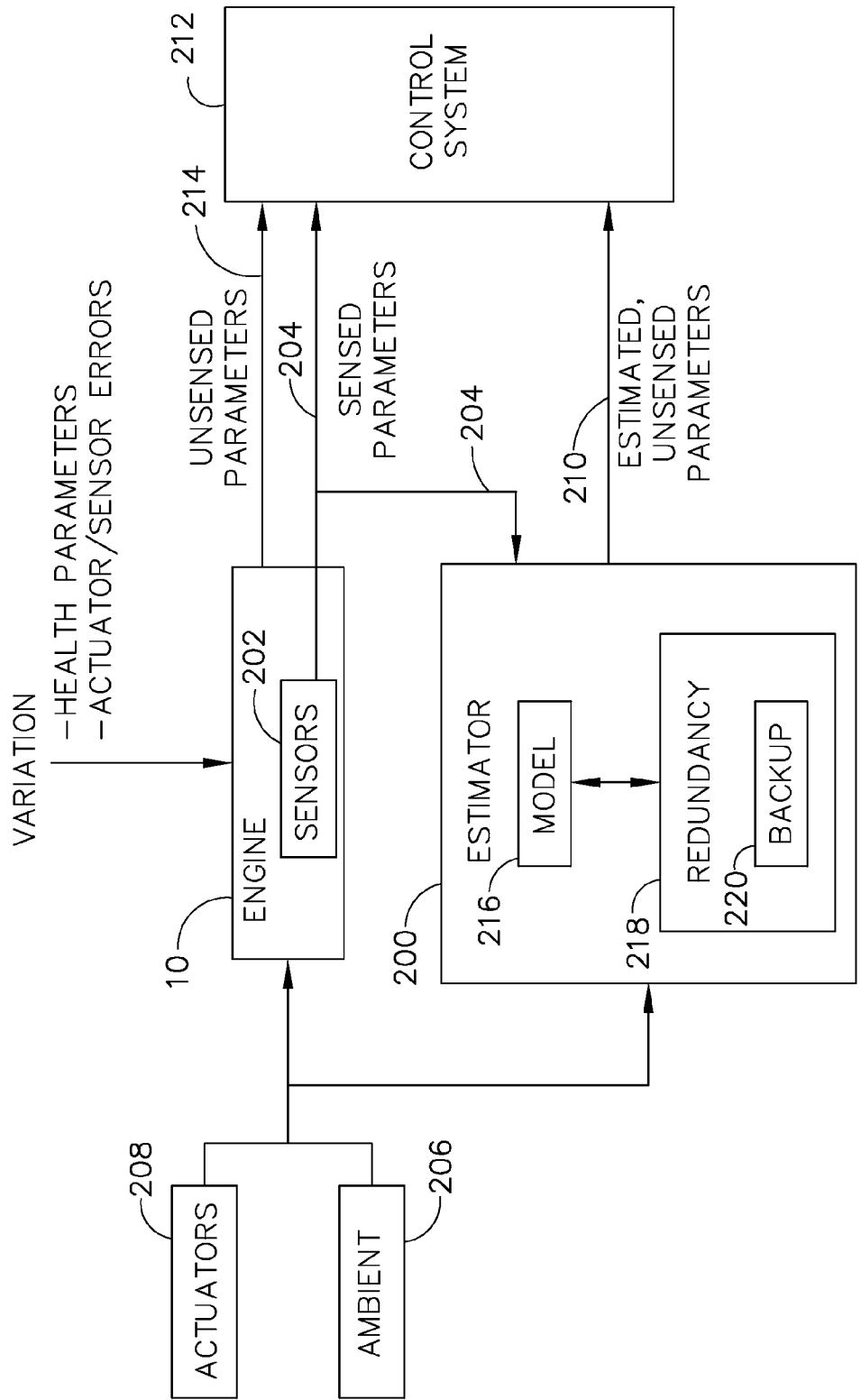
FIG. 2 is a schematic illustration of an exemplary estimation system that may be used with the gas turbine engine shown in FIG. 1.

FIG. 1 is a schematic illustration of an exemplary variable-cycle gas turbine engine 10 having a longitudinal centerline 12. FIG. 2 is a schematic illustration of an exemplary estimation system 200 that may be used with gas turbine engine 10.

Gas turbine engine 10 is shown as being used with an aircraft 14. However, it should be understood that gas turbine engine 10 can be used in any suitable commercial, industrial, and/or residential system and/or application. Gas turbine engine 10 includes an annular inlet 16 that receives ambient air 18 that is channeled downstream to a fan assembly 20, a core gas turbine engine 22 that includes a high pressure compressor (HPC) 24, a combustor 26, and a high-pressure turbine (HPT) 28, a low pressure turbine (LPT) 30 and an augmentor 32 that are coupled in an axial-flow relationship with inlet 16. HPT 28 powers HPC 24 via a first shaft 34. LPT 30 powers fan assembly 20 via a second shaft 36. Engine 10 also includes an outer casing 38 that is spaced from an inner casing 40 that includes a forward section 42 that defines a bypass duct 44. In the exemplary embodiment, augmentor 32 includes a diffuser liner 46.

In the exemplary embodiment, gas turbine engine 10 also includes a valve assembly 48 coupled within bypass duct 44. Valve assembly 48 is separates bypass duct 44 into a radially inner bypass duct 50 and a radially outer bypass duct 52. More specifically, in the exemplary embodiment, inner bypass duct 50 and outer bypass duct 52 are aligned substantially concentrically. Accordingly, and in the exemplary embodiment, fan bypass flow 54 entering bypass duct 44 is divided into an inner bypass flow 56 and an outer bypass flow 58 by valve assembly 48. Moreover, in the exemplary embodiment, valve assembly 48 regulates a volume of inner bypass flow 56 channeled through inner bypass duct 50 and the volume of outer bypass flow 58 that is channeled through outer bypass duct 52.

In the exemplary embodiment, a separation liner 60 contacts an aft portion 62 of valve assembly 48 and is coupled to diffuser liner 46 to facilitate channeling inner bypass flow 56 through inner bypass duct 50. Furthermore, separation liner 60 also facilitates channeling outer bypass flow 58 through outer bypass duct 52. A seal 64 extends between valve portion 62 and separation liner 60 to facilitate reducing leakage of outer bypass flow 58 into inner bypass duct 50.

During operation, air entering engine assembly 10 through inlet 16 is compressed by fan assembly 20. The flow of compressed air exiting fan assembly 20 is split into a first airflow portion 66 that is channeled into core turbine engine 22 and into a second airflow portion, or bypass air 68, that is channeled through bypass duct 44. First airflow portion 66 is also compressed by HPC 24 and is channeled to combustor 26. Airflow discharged from combustor 26 rotates turbines 28 and 30 prior to being discharged from engine 10 through an exhaust 70. Further, bypass air 68 channeled by valve assembly 48 is discharged from engine 10 through exhaust 70.

In the exemplary embodiment, gas turbine engine 10 is a military turbine engine, such as an F110 engine, that is available from General Electric Company, Cincinnati, Ohio. Alternatively, gas turbine engine 10 is a commercial turbine engine, such as a CFM56 gas turbine engine and/or a CF34-10 gas turbine engine, and/or a marine/industrial engine, such as an LM6000 engine, all of which are also available from the General Electric Company. Furthermore, it should be appreciated that in other embodiments, gas turbine engine 10 may be any gas turbine engine containing similar components, such as an F136 engine available from the General Electric Company.

Engine 10 also includes a plurality of sensors 202, which monitor engine operation and input real-time actual engine sensor data or sensor input 204 during engine operation to an engine model, such as an estimation system 200. Exemplary sensors 202 include, but are not limited to, a fan inlet temperature sensor 72, a compressor inlet total pressure sensor 74, a fan discharge static pressure sensor 76, a compressor discharge static pressure sensor 78, an exhaust duct static pressure sensor 80, an exhaust liner static pressure sensor 82, a flame detector 84, an exhaust gas temperature sensor 86, a compressor discharge temperature sensor 88, a compressor inlet temperature sensor 90, a fan speed sensor 92, and a core speed sensor 94. In the exemplary embodiment, sensors 202 monitor engine rotor speeds, engine temperatures, engine pressures, fluid flows, and/or torques. More specifically, in the exemplary embodiment, estimation system 200 receives sensor inputs 204 from four temperature sensors, five pressure sensors, and two speed sensors. Alternatively, estimation system 200 receives any suitable number and/or type of sensor inputs 204.

Further, in the exemplary embodiment, ambient flight condition data 206 is input to estimation system 200. Ambient flight condition data 206 includes, but is not limited to, ambient temperature, ambient pressure, aircraft mach number, and/or engine power setting parameters, such as fan speed or engine pressure ratio. Moreover, actuator position data 208 is input to estimation system 200. Actuator position data 208 includes, but is not limited to only including, fuel flow actuator, variable area actuators, variable stator actuators, and/or bleed valve positions. In an alternative embodiment, any suitable data is input to estimation system 200.

In the exemplary embodiment, estimation system 200 receives data inputs, and calculates or estimates un-measurable operating parameters, taking into account modeling error, operating condition variations, such as thrust level and/or thrust split, and/or variations in sensor bias. In the exemplary embodiment, estimation system 200 estimates a total thrust of engine 10. Alternatively, estimation system 200 estimates other un-measurable operating parameters, such as main-engine thrust, lift fan thrust, thrust split, roll post thrust, roll post moment, turbine temperatures, and/or stall margins. In the exemplary embodiment, estimation system 200 outputs an estimated operating parameter 210 to a control system 212 within aircraft 14. Control system 212 is a FADEC, an on-board computer, and/or any other system that is suitable for controlling engine 10 and/or aircraft 14. More specifically, in the exemplary embodiment, control system 212 controls operations of engine 10, such as fuel injection, positioning of nozzle, variable bypass, and/or lift fan areas, inner and outer blocker door in systems with multiple bypass streams, variable stators, and/or valve positions. Control system 212 also controls operations of aircraft 14, such as an operation of a stabilizer, a ruder, an elevator, a flap, an aileron, a spoiler, and/or a slat. Further, in the exemplary embodiment, estimated operating parameter 210 is used by control system 212 to control at least one engine and/or aircraft operation. Control system 212 also receives sensor inputs 204 and/or an unsensed parameter 214 to control at least one operation of engine 10 and/or aircraft 14.

In the exemplary embodiment, estimation system 200 includes a primary model 216 and a redundancy system 218. Primary model 216, in the exemplary embodiment, calculates, or estimates, an un-measurable operating parameter. Redundancy system 218 is coupled in communication with primary model 216 and monitors the operating parameter estimated by primary model 216. More specifically, redundancy system 218 monitors primary model estimations and determines whether any anomaly has occurred during estimation. For example, primary model 216 and/or redundancy system 218 determines when a mathematical limitation of primary model 216 has been met or exceeded and/or when one of the sensor value inputs to primary model 216 is faulted. In the exemplary embodiment, when an anomaly is determined to be present and/or exist, redundancy system 218 calculates or estimates operating parameter 210 using at least one backup model 220 within redundancy system 218. As such, redundancy system 218 compensates for the anomaly within primary model 216 and outputs estimated operating parameter 210, as calculated by backup model 220. More specifically, redundancy system 218 may be any suitable system that corrects and/or compensates for anomalies in primary model 216, such as an anomaly in a sensor input and/or within primary model 216 itself.

In the exemplary embodiment, primary model 216 is an active model, and redundancy system 218 includes at least one backup model 220 that is a passive model. Backup model 220 is any type of model described herein and/or any other suitable type of model for use in estimating the operating parameter. As such, when primary model 216 is outputting estimated operating parameter 210, backup model 220 is calculating the operating condition, but is not outputting results. When an anomaly occurs in primary model 216, backup model 220 becomes the active model, and primary model 216 becomes the passive model until the anomaly no longer exists, as described in more detail below. As used herein, an anomaly is, for example, but is not limited to being, a sensor transient, a lack of sensor input, and/or a mathematical limitation of primary model 216. A mathematical limitation of primary model 216 is, for example, a situation in which model 216 cannot accurately estimate the operating parameter due to limitations of the logic within primary model 216.

In the exemplary embodiment, redundancy system 218 includes two backup models 220 that are each the same type of model as primary model 216. Alternatively, backup model(s) 220 are types of models that are different than the model type of primary model 216. In the exemplary embodiment, estimation system 200 receives a plurality of measured inputs, as described herein. Primary model 216 receives all of the measured inputs and acts as the active source of estimated operating parameter 210. A first of backup models 220 receives a first set of measured inputs, and a second of backup models 220 receives a second set of measured inputs, wherein the first set and the second set include different inputs with no overlap. In an alternative embodiment, there is overlap between the first and second sets.

In the exemplary embodiment, when a transient in one of the inputs and/or a lack of input signal from one of the inputs occurs such that primary model 216 receives an anomalous input, the backup model 220 that does not include the anomalous input becomes active and estimates operating parameter 210 for output to control system 212. As such, at least one of the backup models 220 compensates for the anomaly in primary model 216 by outputting operating parameter 210 rather than primary model 216 outputting operating parameter 210. When the anomalous input returns to normal, primary model 216 again becomes active and estimates operating parameter 210 for output to control system 212, and backup models 220 return to a passive operational state.

In an alternative embodiment, redundancy system 218 includes a predetermined number of backup models 220 based on the number of measured inputs to primary model 216. In the exemplary embodiment, backup models 220 are each the same type of model as primary model 216. Alternatively, backup model(s) 220 may be model types that are different than the model type of primary model 216. In the exemplary embodiment, each backup model 220 receives all but one of the measured inputs. For example, but in no way limiting, if primary model 216 receives ten measured inputs, redundancy system 218 includes ten backup models 220, wherein each backup model 220 includes nine inputs. Each backup model 220 lacks a different measured input such that, if an input becomes an anomalous input, the backup model 220 lacking the anomalous input becomes active and compensates for primary model 216, as described above.

In yet another alternative embodiment, redundancy system 218 includes a backup model 220 that is a different type of model than the model type of primary model 216. For example, but in no way limiting, if primary model 216 is a data-based type of model, backup model 220 is a physics-based type of model. In one embodiment, and referring to the model types described in more detail below, primary model 216 is a first type of model, and redundancy system 218 includes three backup models 220 that are each a different type of model from each other and from primary model 216. In the exemplary embodiment, when primary model 216 and/or backup model 220 determines that primary model 216 has a mathematical limitation that is producing anomalous estimated operating parameters, backup model 216 becomes the active model, and primary model 216 becomes the passive model. As such, when primary model 216 is limited, backup model 220 calculates operating parameter 210 and outputs operating parameter 210 to control system 212. When primary model 216 and/or backup model 220 determines that primary model 216 is no longer limited, primary model 216 becomes active, and backup model 220 becomes passive.

In the exemplary embodiment, primary model 216 and/or backup model 220 may be any suitable model for estimating thrust. For example, primary model 216 and/or backup model 220 is a physics-based model, a data-based regression model, and/or a data-based map model. Four general model types are described herein for use as primary model 216 and/or backup model 220. However, it will be understood that any suitable model and/or model type may be used as primary model 216 and/or backup model 220.

In the exemplary embodiment, primary model 216 and/or backup model 220, regardless of model type, uses the following inputs to estimate the operating parameter: (1) environmental inputs, such as temperature, pressure, rotational speeds, torque, flow measurements, and/or changes in such inputs; (2) estimates of unmeasured inputs, such as bleeds, power extraction, and/or other parameters provided as user-inputs and/or from an on-board estimation algorithm; (3) estimates of engine health parameters, such as loss and flow scalars provided as user-inputs and/or from an on-board estimation algorithm; (4) actuator position demands, such as fuel flow, areas, stator positions, and/or variable valve positions; and (5) derived closed-loop control parameter references related to power level. Inputs in categories (2), (4), and (5) may include errors, which model 216 and/or 220 is configured to account for. Further, model 216 and/or 220 outputs estimated operating parameters, such as performance parameters, for example, thrust, temperature, stall margin, and/or corrected airflows, and/or closed-loop actuator positions.

Model Type 1: Data-Based Model

Figure 3:
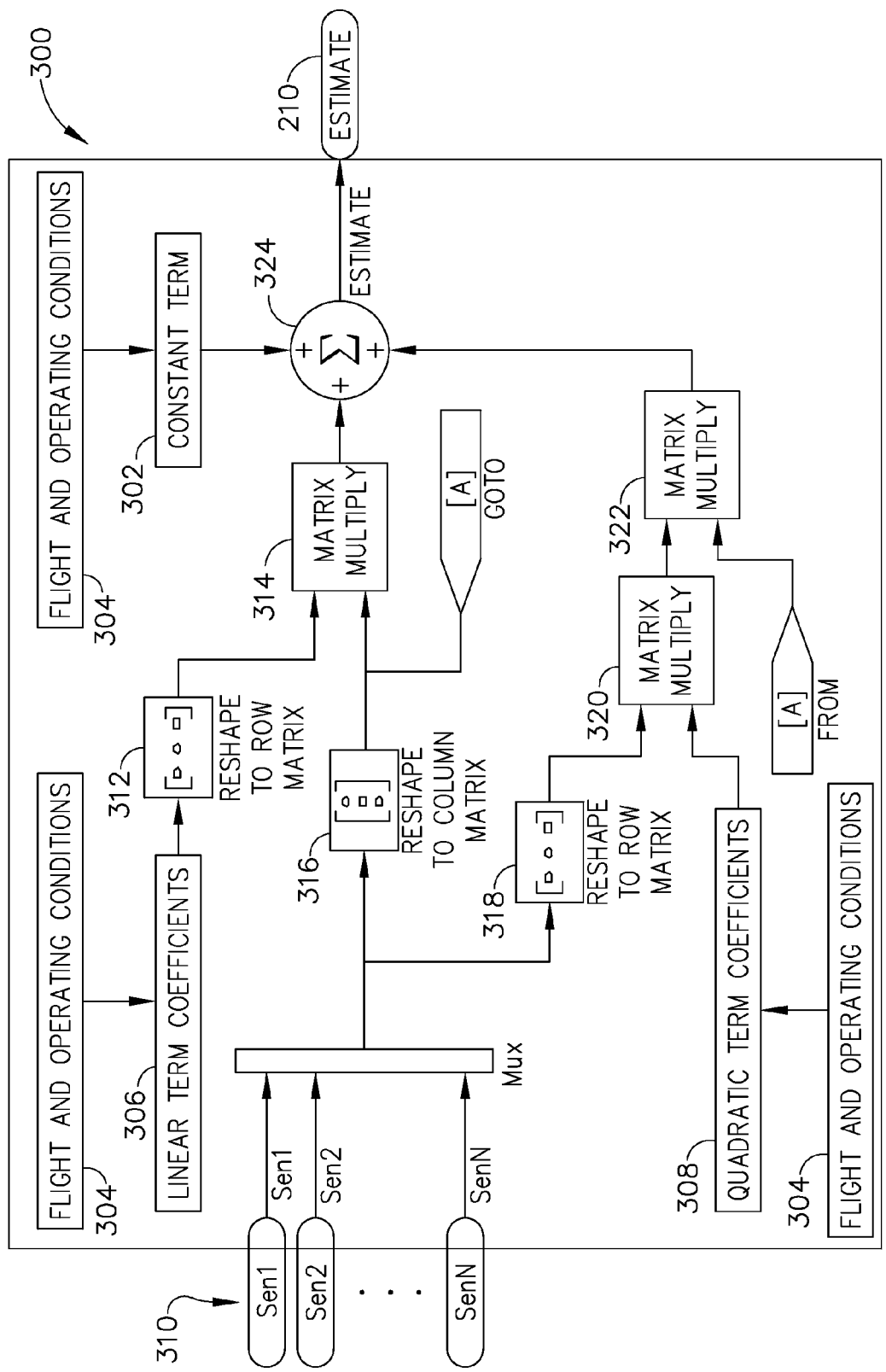
FIG. 3 is a schematic illustration of a data-based model that may be used with the estimation system shown in FIG. 2.

FIG. 3 shows a schematic illustration of a data-based model 300 that may be used with estimation system 200 (shown in FIG. 2). Model 300 includes a constant term 302 that is computed using flight and operating conditions 304 using a process known as gain-scheduling. Flight and operating conditions 304 include, but are not limited to, sensed parameters indicative of altitude, mach number, and/or engine power level. Such parameters include, for example, inlet temperature T2, inlet pressure P2, and/or compressor exit static pressure Ps3. Model 300 also includes linear terms 306 and quadratic terms 308 that are also gain-scheduled using flight and operating conditions 304. Model 300 receives a plurality of sensor signals 310, which include, but are not limited to including, measured engine rotor speeds, temperatures, and/or pressures.

An estimate of estimated operating parameter 210 is obtained by generating regression fits of the form:

$$Y = X*R, \tag{1}$$

where R is a regression vector of size 1×n and X is a vector of sensors of size n×1 when Y is an output value at a single condition. X is a matrix of size m×n when Y is a vector of size 1×m representing output values at m different operating conditions. Matrix equation (1) translates to a linear regression fitting the form:

$$F = c + \Sigma\{a(i) * x(i)\} \text{ [for } i=1:n\text{]}, \quad (2)$$

where F is estimated operating parameter 210, c is a coefficient, a is a vector of coefficients, i is a sensor, x is a sensor input, and n is the total number of sensor inputs. Matrix equation (1) can also translate to a quadratic regression fitting the form:

$$F = c + \Sigma\{a(i) * x(i)\} + \Sigma\Sigma\{b(i,j) * x(i) * x(j)\} \text{ [for } i=1:n; \\ j=i:n\text{]}, \quad (3)$$

where F is estimated operating parameter 210, c is a coefficient, a is a vector of coefficients, i is a first sensor, x is a combination sensor inputs, b(i,j) is a matrix of coefficients, j is a second sensor, and n is the total number of sensor inputs. For example, n is the size of the input vector x. In the exemplary embodiment, sensor input are inputs generated by a sensor, although the sensor inputs may be values derived from inputs generated by sensors, such as a corrected fan speed, $Nl/\sqrt{(T2/518.67)}$, and/or a corrected fuel flow, Wfuel/Ps3.

In the exemplary embodiment, the quadratic regression fit for vector-based implementation as shown in FIG. 3 is:

$$F = c + a.*x + x^T * B * x, \quad (4)$$

where F is estimated operating parameter 210, c is a coefficient, a is a vector of coefficients, x is a vector of sensor inputs, and B is a matrix of coefficients. The matrix B in Equation (4) is related to the matrix b in Equation (3), but is not the same as matrix b. Further, Equation (4) is essentially Equation (3) with j being summed from 1:n instead of i:n, as shown below in Equation (5):

$$F = c + \Sigma\{a(i) * x(i)\} + \Sigma\Sigma\{B(i,j) * x(i) * x(j)\} \text{ [for } i=1:n; \\ j=1:n\text{]}. \quad (5)$$

In the exemplary embodiment, blocks 312 and 314 show an implementation of the linear term a.*x in Equation (4), and blocks 316, 318, 320, and 322 show an implementation of the quadratic term $x^T * B * x$ in Equation (4). Summing junction 324 adds the constant, linear, and quadratic terms to compute estimated operating parameter 210.

While the description above and FIG. 3 show the construction of a quadratic equation or a second-order polynomial, it will be understood that higher-order polynomials and/or other mathematical forms, such as linear and/or nonlinear equations, can be used with model 300. For example, in an alternative embodiment, a Neural Network is used with model 300.

Model Type 2: Thrust Map Model

A Thrust Map Model (TMAP) is a relatively simple physics-based model that adequately estimates absolute thrust and/or thrust changes. The TMAP can be used for steady-state and/or transient conditions. The TMAP is based on a nominal engine cycle and does not account for propulsion system deteriorations and/or health. In the exemplary embodiment, the TMAP uses exhaust nozzle areas and/or delta pressures across exhaust nozzles to estimate thrust components, wherein the parameters are obtained either from sensors or using simple table-lookups with sensed or derived parameters as table inputs.

Model Type 3: Analytic Partials Model

An analytic partials model is a relatively moderately complex physics-based model and is substantially accurate for thrust changes and generally accurate for absolute thrust. In the exemplary embodiment, the analytic partials model does not include a tracking filter. Further, the analytic partials model is partially usable in multiple input-multiple output (MIMO) control. In the analytic partials model, basic equations that describe the physical relationships between engine components are differentiated analytically to obtain linear models whose coefficients contain nonlinear terms. The basic equations include, but are not limited to including, component performance maps for fans, compressors, and turbines; a heat addition equation in the combustor; fan pressure and temperature stratification; static pressure balance; flow continuity; and/or unbalanced torque equations.

Model Type 4: Component Level Model

Figure 4:
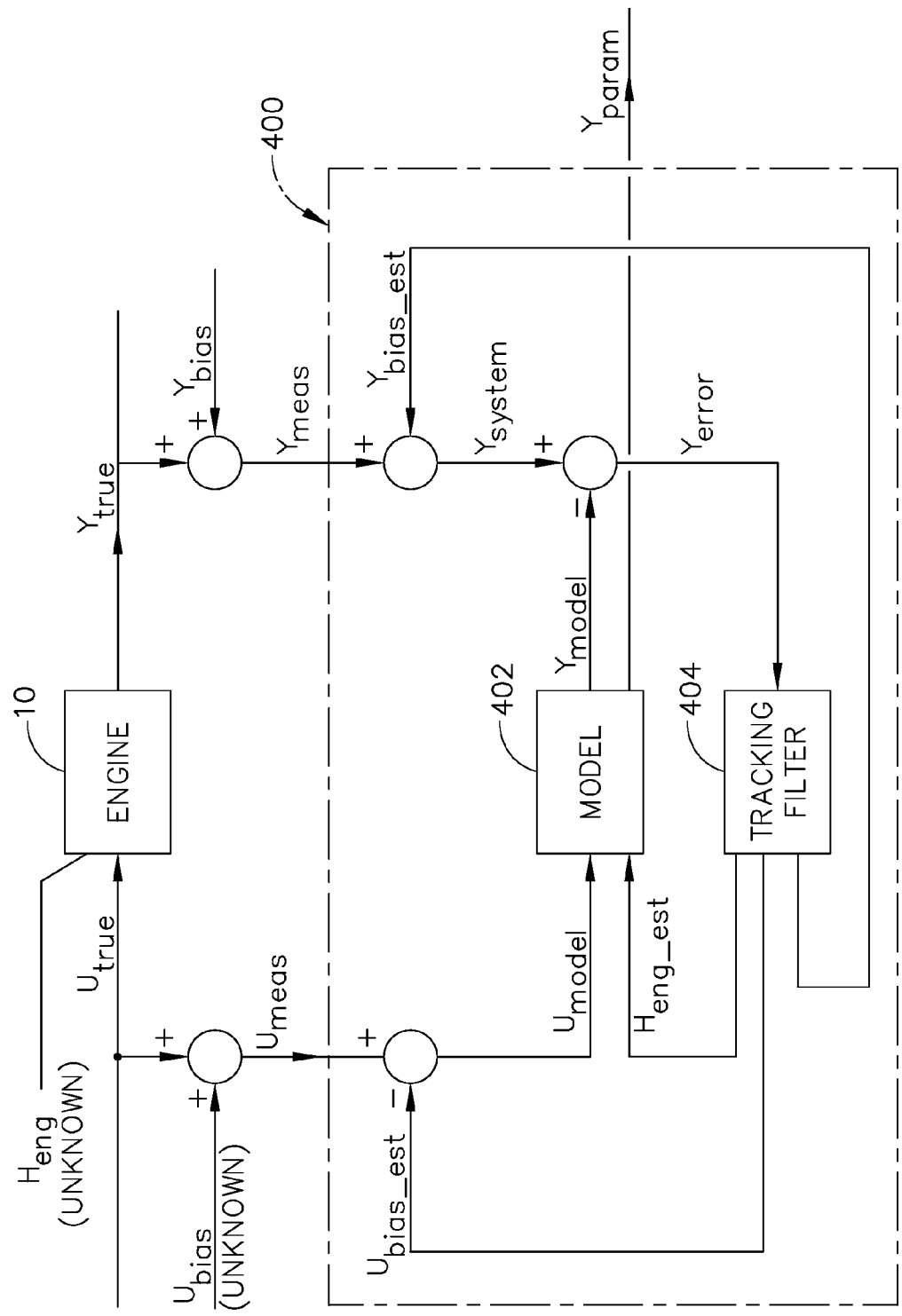
FIG. 4 is a schematic illustration of a physics-based model that may be used with the estimation system shown in FIG. 2.

FIG. 4 shows a schematic illustration of a high-fidelity, real-time, nonlinear, dynamic physics-based model 400 that may be used with estimation system 200 (shown in FIG. 2). More specifically, physics-based model 400 is a component level model (CLM) that includes a system model 402 that models each component of engine 10 individually and assembled together to reflect correct engine physics. Alternatively, physics-based model 400 is any physics-based model that is suitable for estimating un-measurable parameters. In the exemplary embodiment, physics-based model 400 is a relatively complex model that is substantially accurate for absolute thrust and/or thrust changes. In the exemplary embodiment, physics-based model 400 includes any suitable tracking filter 404 configured to account for engine-to-engine variation. Tracking filter 404 can be designed using any of the parameter estimation algorithms well-known to those versed in the art, including but not limited to including, Kalman filters, extended Kalman filters, modified Kalman filters such as information filters and particle filters, proportional plus integral controller type filters, and/or Neural Networks. In an alternative embodiment, physics-based model 400 does not include tracking filter 404. In the exemplary embodiment, physics-based model 400 is usable with MIMO control.

In FIG. 4, $H_{eng}$ is a health of engine 10, $U_{bias}$ is an unknown measurement bias and/or error, $U_{true}$ is an actual input value, $U_{meas}$ is a measured input value with the measurement bias $U_{bias}$, $U_{bias\_est}$ is an estimated bias, $U_{model}$ is a corrected input value, $H_{eng\_est}$ is an estimate of engine health, $Y_{true}$ is an actual output value, $Y_{bias}$ is an unknown measurement bias and/or error, $Y_{meas}$ is a measured output value with the measurement bias $Y_{bias}$, $Y_{bias\_est}$ is an estimated bias, $Y_{system}$ is a corrected output value, $Y_{model}$ is a calculated output value, $Y_{error}$ is a difference between the calculated output value $Y_{model}$ and the corrected output value $Y_{system}$, and $Y_{param}$ is estimated operating parameter 210 (shown in FIG. 2).

As shown in FIG. 4, physics-based model 402 receives the corrected input values $U_{model}$, such as corrected actuator positions, which are equal to the measured value $U_{meas}$ corrected by the estimated bias, $U_{bias\_est}$ of the unknown measurement bias $U_{bias}$. The estimated bias $U_{bias\_est}$ is calculated by tracking filter 404 using differences between calculated output values $Y_{model}$ and corrected output values $Y_{system}$. Tracking filter 404 also calculates estimates of the unknown health of engine 10 $H_{eng}$, as $H_{eng\_est}$. Health parameters include, but are not limited to including, modifiers for component efficiencies and flows, pressure losses, cooling flows, bleeds, and/or power extraction values. As the estimated values $U_{bias\_est}$ and $H_{eng\_est}$ approach the true values $U_{bias}$ and $H_{eng}$, engine model 402 provides a more accurate representation of engine 10 and estimated operating parameter $Y_{param}$, such as a thrust and/or a stall margin. Model 400 outputs estimated operating parameter $Y_{param}$ to control system 212 (shown in FIG. 2) as estimated operating parameter 210 (shown in FIG. 2).

The above-described embodiments substantially accurately estimate an un-measurable operating parameter for use in controlling a gas turbine engine and/or system that includes the gas turbine engine. More specifically, the estimation systems described herein may be implemented in an aircraft to estimate an operating parameter, such as thrust, for controlling the gas turbine engine and/or the aircraft. As such, each estimation system acts as a "virtual sensor" to sense un-measurable parameters when there is no sensor available and/or a suitable sensor is impractical due to cost, materials, and/or other considerations.

Further, the estimation systems described herein is sufficiently accurate that design margins are facilitated to be decreased, as compared to gas turbine engines that include known control system. As such, the reduced design margins facilitate increasing the performance and/or condition of a gas turbine engine that includes the estimation system. Moreover, the above-described estimation system can include a data-based model that is easier to certify, lowers central processing unit (CPU) time, and/or is simpler to implement and/or maintain than at least some physics-based models. However, the physics-based models described herein provide for substantially accurate operating parameter estimations that take into account engine-to-engine variations. Accordingly, the estimation system described herein can be adjusted to the application for which the gas turbine engine is used by providing a plurality of model types. Additionally, the above-described redundancy system provides an alternate model that will avoid any anomalies within the primary model to facilitate ensuring that accurate estimated operating parameters are provided to a control system.

Exemplary embodiments of methods and system for operating parameters of an engine are described above in detail. The methods and systems are not limited to the specific embodiments described herein, but rather, components of systems and/or steps of the methods may be utilized independently and separately from other components and/or steps described herein. For example, the methods may also be used in combination with other estimation systems and methods, and are not limited to practice with only the gas turbine engine systems and methods as described herein. Rather, the exemplary embodiment can be implemented and utilized in connection with many other parameter estimation applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for estimating an operating parameter of a turbine engine, said method comprising:
   receiving a plurality of sensor inputs;
   calculating the operating parameter using at least one of the plurality of sensor inputs and using a first model of the turbine engine;
   determining whether an anomaly is present in the calculated operating parameter using a redundancy system, the redundancy system comprising a second model of the turbine engine, said second model including a first backup model configured to receive a first set of sensor inputs of the plurality of sensor inputs and a second backup model configured to receive a second set of sensor inputs of the plurality of sensor inputs; and
   outputting an estimated operating parameter determined using the first model if no anomaly is present or determined using the second model if an anomaly associated with the first model is present.

2. A method in accordance with claim 1 wherein receiving at least a sensor input further comprises receiving the sensor input, an actuator position input, and an ambient condition input.

3. A method in accordance with claim 1 wherein receiving at least a sensor input further comprises receiving at least one of a sensed temperature, a sensed pressure, a sensed speed, a sensed torque, and a sensed flow characteristic.

4. A method in accordance with claim 1 wherein calculating the operating parameter further comprises calculating the operating parameter using a data-based model.

5. A method in accordance with claim 1 wherein calculating the operating parameter further comprises calculating the operating parameter using a physics-based model.

6. A method in accordance with claim 5 wherein calculating the operating parameter further comprises calculating the operating parameter using the physics-based model and a tracking filter.

7. A method in accordance with claim 1 wherein determining whether an anomaly is present in the calculated operating parameter using a redundancy system further comprises:
   if it is determined that the anomaly is present:
      compensating for the anomaly using a backup model within the redundancy system, wherein the backup model calculates a corrected estimated operating parameter; and
      outputting the corrected estimated operating parameter; and
   if it is determined that the anomaly is not present, outputting the calculated operating parameter.

8. An estimation system for estimating an operating parameter, said estimation system comprising:
   a primary model configured to receive a plurality of sensor inputs and to estimate the operating parameter using at least the sensor input; and
   a redundancy system comprising a predetermined number of backup models including at least a first backup model configured to receive a first set of sensor inputs of the plurality of sensor inputs and a second backup model configured to receive a second set of sensor inputs of the plurality of sensor inputs, said predetermined number of backup models being equal to a number of the plurality of sensor inputs, said redundancy system configured to receive the estimated operating parameter and to determine whether an anomaly is present within the estimated operating parameter, said redundancy system further configured to estimate the operating parameter using at least one of the plurality of sensor inputs when the anomaly is present.

9. An estimation system in accordance with claim 8 wherein said primary model comprises one of a data-based model and a physics-based model.

10. An estimation system in accordance with claim 8 wherein said primary model is configured to receive the plurality of sensor inputs, an actuator position input, and an ambient condition input, wherein the plurality of sensor inputs includes at least one of a sensed temperature, a sensed pressure, a sensed speed, a sensed torque, and a sensed flow characteristic.

11. An estimation system in accordance with claim 8 wherein said redundancy system further comprises a plurality of backup models, said plurality of backup models configured to:
compensate when an anomaly is present within said estimated operating parameter; and
output a corrected estimated operating parameter.

12. A gas turbine engine for use in an aircraft, said gas turbine engine comprising:
a plurality of sensors configured to receive a plurality of sensor inputs and to sense an engine parameter and to generate a sensor input representing the engine parameter;
a control system configured to control at least one of said gas turbine engine and the aircraft; and
an estimation system coupled in communication with said control system, said estimation system configured to output an estimated operating parameter to said control system, said estimation system comprising:
a primary model configured to receive at least one of the plurality of sensor inputs and to estimate the operating parameter using the at least one of the plurality of sensor inputs; and
a redundancy system comprising a secondary model that includes a first backup model configured to receive a first set of sensor inputs of the plurality of sensor inputs and a second backup model configured to receive a second set of sensor inputs of the plurality of sensor inputs, said redundancy system configured to receive the estimated operating parameter and to determine whether an anomaly is present within the estimated operating parameter, said redundancy system further configured to generate a secondary operating parameter using the secondary model and output the secondary operating parameter to the control system.

13. A gas turbine engine in accordance with claim 12 wherein said control system is configured to control one of said gas turbine engine and the aircraft using the estimated operating parameter.

14. A gas turbine engine in accordance with claim 12 wherein said plurality of sensors comprise at least one of a temperature sensor, a pressure sensor, a speed sensor, a torque sensor, a flow sensor, an ambient condition sensor, and an actuator position sensor.

15. A gas turbine engine in accordance with claim 12 wherein said primary model comprises one of a data-based model and a physics-based model having a tracking filter.

16. A gas turbine engine in accordance with claim 12 wherein said primary model is configured to receive a predetermined number of sensor inputs, said redundancy system further comprising a predetermined number of backup models, said predetermined number of backup models being equal to the predetermined number of sensor inputs.

17. A gas turbine engine in accordance with claim 12 wherein said primary model comprises a first model type, and wherein said redundancy system comprises at least a second model type different than said first model type, said redundancy system configured to:
determine whether an anomaly is present in said first model type;
calculate said operating parameter using said second model type; and
output the operating parameter calculated using said second model type to said control system.

* * * * *